UNITED STATES PATENT OFFICE 2,731,633
Patented Jan. 17, 1956

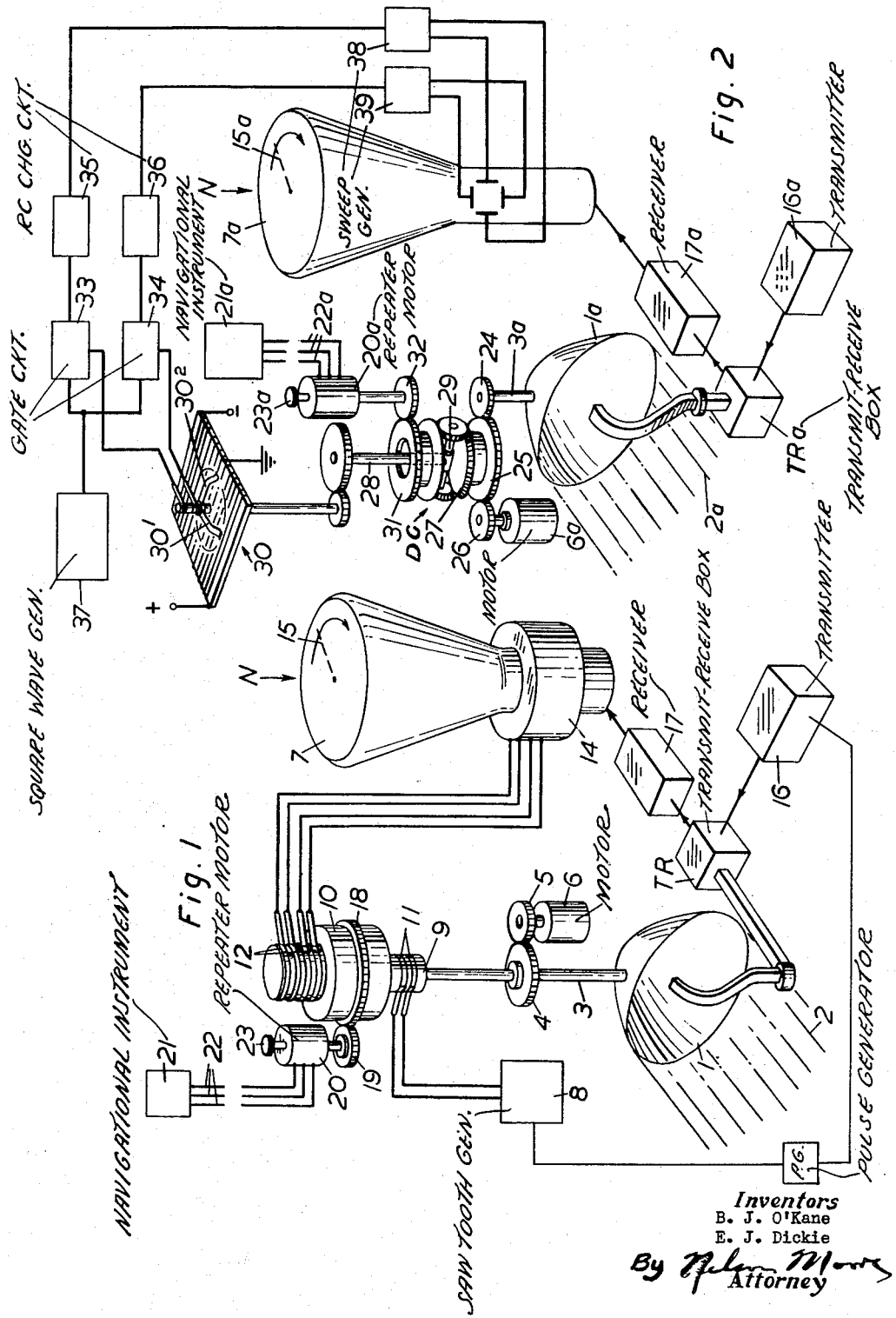

2,731,633

AZIMUTH STABILIZED PLAN POSITION INDICATOR

Bernard J. O'Kane, Harrow-on-the-Hill, and Eric J. Dickie, Rayne, near Braintree, England, assignors to The General Electric Company Limited, London, England Application July 25, 1947, Serial No. 763,568
In Great Britain May 16, 1945

Section 1, Public Law 690, August 8, 1946
Patent expires May 16, 1965

8 Claims. (Cl. 343—11)

This invention relates to improvements in navigating apparatus of the kind in which the terrain being navigated is scanned by a pulse modulated radio beam and echoes of the pulses are displayed on a cathode ray tube in a manner such as to present a map-like picture of said terrain.

The transmitting aerial, which usually also acts as the receiving aerial, is adapted to emit a narrow beam which at any instant covers a small sector of the terrain in question. The cathode ray tube is provided with a radial time base which is triggered by a transmitted pulse and as successive echoes of the pulse are received they are caused to brighten the trace from the centre of the tube outwards. By causing the aerial and the radial time base to rotate in synchronism and by repeating the process of transmitting a pulse and displaying the echoes along the radial trace for each small sector, a complete picture of the terrain is painted on the screen of the tube, assuming the afterglow time of the screen is comparable with the time taken for the aerial to make one revolution.

When such an apparatus is installed on a moving vehicle or craft difficulty is encountered in determining bearings in azimuth on the display, since every time the craft alters course the display rotates correspondingly. The display does, in fact, in the arrangement described orientate in relation to the course or heading of the craft.

According to the present invention, means are provided for controlling the time base of the cathode ray tube so as to maintain the orientation of the display with reference to some external bearing (i. e. a bearing other than the instantaneous course bearing) such as magnetic or true north or the track of the vehicle or craft in which the apparatus is installed. For example, the display may be orientated so that magnetic north is always at 12 o'clock (using the normal clock-face convention). It may, however, be more advantageous in certain circumstances to orientate the display in relation to the track of the craft.

Apparatus in accordance with the invention comprises a pulse modulation radio transmitter-receiver, a rotatable directive aerial device, a cathode ray tube indicator, radial time base generator for said tube, and means for causing the time base to rotate, arranged in combination to display on the screen of the tube a map-like representation of the terrain scanned by the aerial device, wherein means are provided for controlling the rotation of the time base so as to maintain the orientation of the display with reference to an external bearing (i. e. a bearing other than the instantaneous course bearing).

The means for causing the time base to rotate may include a rotary transformer driven from the aerial device and the rotation of the time base may be controlled to maintain the orientation of the display with reference to an external bearing by maintaining the stator of said transformer fixed in relation to said bearing.

According to a modification the means for causing the time base to rotate may include a semi-cosine potentiometer driven from the aerial device and the rotation of the time base may be controlled to maintain the orientation of the display with reference to an external bearing by means of a differential gear interposed in the drive between the aerial device and the said potentiometer.

Reference will now be made to the accompanying drawings illustrating practical embodiments of the invention. In the drawings—

Fig. 1 is a diagrammatic representation of one practical embodiment

Fig. 2 is a similar representation of a modification.

Referring to Fig. 1, a directive aerial device 1 adapted to transmit pulse modulated radio waves and to receive the echoes thereof within the confines of a narrow beam 2, is mounted on a shaft 3 driven by gears 4, 5 from a motor 6. A cathode ray tube 7 is furnished with a rotating radial time base generating means in the form of a sawtooth generator 8 and a rotary transformer comprising a rotor 9 and stator 10.

The rotor 9 is mounted on the shaft 3 and is fed through slip rings 11 from the sawtooth generator 8. The stator 10 incorporates two field coils mounted in quadrature which are connected through slip rings 12 and 13 to the deflecting means 14, such as coils, associated with the X and Y axes of the cathode ray tube 7. The result is a radial time base 15 which rotates in synchronism with the aerial device 1. A transmitter 16 feeds pulse-modulated energy to the aerial device 1 at a pulse repetition frequency such that one pulse is transmitted for, say, every ½° turn of the aerial device. This repetition frequency is synchronised with the frequency of the sawtooth generator 8 so that the radial time base trace 15 on the cathode ray tube 7 is at the centre of the tube and starting on an outward sweep at or shortly after the transmission of each pulse. This synchronism may be effected in any well known way such as by having a common pulse generator PG for triggering the sawtooth generator 8 and modulating the transmitter 16. Echoes of the transmitted pulses are received by the aerial device 1 and fed to a receiver unit 17 wherein they are detected and amplified. The amplified echoes are then fed to the grid of the cathode ray tube 7 so as to modulate the trace 15 in accordance with the intensity of the echoes. The fly back is blacked out in known manner. The aerial 1 is connected to the transmitter 16 and receiver 17 in proper sequence by a switch device TR.

The apparatus described above is capable of reproducing on the face of the cathode ray tube a map-like display (not necessarily linear in scale) representing an echo signal picture of the terrain scanned by the beam 2. No indication of bearing is, however, given on the display and if the vehicle or craft on which the apparatus is installed alters course the display rotates correspondingly.

One practical method of carrying out the present invention when, as in the example illustrated the apparatus includes a rotary transformer, is to mount the stator 10 of the rotary transformer so that it is capable of rotation by gears 18 and 19 and to maintain the stator 10 on a constant bearing by a repeater motor 20 controlled by a distant reading navigational instrument 21. The repeater motor 20 may be controlled through leads 22 by cam actuated contacts embodied in the navigational instrument 21 and automatically maintains some predetermined point on the periphery of the stator 10 in the direction of the required bearing such as magnetic or true north in which case the navigational instrument could be a distant reading compass. In other words, however much the vehicle or craft alters course the stator 10 maintains a predetermined bearing in azimuth and the orientation of the display is maintained in accordance with such bearing. It is then only necessary to provide some means of adjustment (such as a manual control 23 for actuating the repeater motor 20 independently of the instrument 21) for initially orientating the display until, say, the top represents magnetic or true north and thereafter the orientation is automatically maintained.

Similarly, if it is desired to orientate the display in relation to the track of the craft, the navigational instrument 21 may consist of a drift angle computer of any known type.

According to a further embodiment of the invention a directive aerial device 1a is mounted on a shaft 3a driven through gears 24, 25 and 26 by a motor 6a. The gear 25 is fixed to one of the sun wheels 27 of a differential gear DG. The shaft 28 of the planet wheel assembly 29 drives a sine-cosine potentiometer 30 of known construction. The other sun wheel 31 of the differential gear DG is driven by a gear 32 on the shaft of a repeater motor 20a controlled through leads 22a by a navigational instrument 21a. The arrangement is such that, with the gear 31 held stationary, the sine-cosine potentiometer 30 is driven by the motor 6a at the same speed as the aerial device 1a but that movement of the motor 20a adds to or subtracts from the movement of the sine-cosine potentiometer 30 in accordance with the change of bearing derived from the navigational instrument 21a. The centre point of the potentiometer winding is earthed and the ends maintained at equal and opposite potentials so that the wiper arms $30^1$ and $30^2$ which are angularly spaced by 90 deg. pick off voltages which vary as the sine and the cosine respectively of the angular position of the potentiometer shaft relatively to the winding. These voltages are fed to gate circuits 33 and 34 respectively which control the amplitudes of square waves applied to RC charging circuits 35 and 36 from a square wave generator 37 synchronised with the transmitter 16a. The arrangement is such that sawtooth time base waveforms are formed by the RC circuits 35 and 36 and these waveforms vary in amplitude in accordance with the sine and cosine respectively of instantaneous angular position of the aerial device 1a relatively to a datum bearing determined by the navigating instrument 21a. These time base waveforms are fed to paraphase amplifiers 38 and 39, the outputs from which are fed to the X and Y deflecting plates of the cathode ray tube 7a and result in a rotating radial time base 15a as in the example of the invention described with reference to Fig. 1.

It will be apparent to those skilled in the art that depending on particular requirements a rotary transformer with a fixed stator but otherwise similar to that described with reference to Fig. 1 with its associated sawtooth generator 8 and cathode ray deflecting means 14, could be substituted for the potentiometer 30 and associated parts 33 to 39.

Similarly, the method employed in Fig. 1 of introducing the bearing variation by driving the rotor of the rotary transformer from a navigating instrument could be applied to the apparatus shown in Fig. 2 by arranging to rotate the frame carrying the winding of the potentiometer 30 under the control of the said instrument thereby dispensing with the differential gear.

We claim:

1. In radio navigation apparatus for use on a mobile craft, a pulse modulated radio transmitter-receiver, a rotatable directive aerial device, switching means connecting said aerial selectively with the transmitting and receiving portions of said transmitter-receiver in a selected time sequence, a cathode ray tube indicator connected to the receiver portion of said transmitter-receiver for modulation thereby, a radial time base generator assembly connected to said cathode ray tube indicator, means on the craft responsive to changes in the heading of the craft, and differential means connected to said second-named means and to said rotatable directive aerial device to maintain the orientation of the display on the cathode ray tube indicator constant during change of the compass heading of the said mobile craft, said differential means including means for controlling the rotation of the time base in accordance with both the rotation of said directive aerial device and the changes in compass heading of the said mobile craft.

2. Radio navigation apparatus according to claim 1, wherein the differential means comprises a rotary transformer and means for driving the rotor of the rotary tansformer from the said directive aerial device, and means for driving the stator of the rotary transformer through angles equal to the said changes in compass heading of the said mobile craft.

3. Radio navigation apparatus according to claim 1, wherein the differential means comprises a differential gear train, and means for driving the said differential gear train independently in accordance with both the rotation of said directive aerial device and the changes in compass heading of the said mobile craft, and the radial time base generator assembly comprises a sine-cosine potentiometer having a shaft which is connected to the differential drive of said differential gear train.

4. Navigational radar apparatus for providing a plan position indicator display for use on a mobile craft vehicle comprising in combination, a rotatable antenna system which system includes means rendering the same directional thus limiting the reception of radiant energy to a predetermined angular range; and indicating means for indicating the received energy comprising all of the following: a cathode ray tube having elements for deflecting said cathode ray radially at each angular position of said rotatable antenna and further elements for modifying a resulting radial trace to indicate receipt of radiant energy, time-base generating means for applying potentials to said deflecting elements of said cathode ray tube to effect said radial deflection, means to effect a rotation of the radial trace in synchronism with the rotation of said antenna system, and phasing means for varying the phase relation between the rotation of said radial trace and the rotation of said rotatable directive antenna system, said phasing means including means for varying the angle of said phase relation in accordance with the variations in the compass heading of said mobile craft to provide azimuth stabilization of said plan position indicator display.

5. Navigational radar apparatus, for use on a mobile craft and providing on the screen of a cathode ray oscilloscope a plan position indication display of which the indication corresponding to a fixed compass direction from the mobile craft is automatically maintained, in operation, in a fixed orientation on the screen of said cathode ray oscilloscope notwithstanding any alteration in the compass heading of the mobile craft, the said apparatus comprising, a rotatable directive beam antenna system, means for rotating the antenna system about an axis which is vertical when the mobile craft is on an even keel, a periodic pulse modulated radio frequency transmitter, a receiver, means for connecting said transmitter and the receiver to the antenna system, a cathode ray oscilloscope having electrode elements for modulating the intensity of the cathode ray beam in dependence upon signals applied thereto and two pairs of deflecting elements disposed at right angles to one another, circuit means connecting said receiver to said modulating electrode elements to modulate the intensity of said cathode ray beam in dependence upon the signals received by the receiver, a compass on the craft, electro-mechanical differential means connected to said compass and to said means for rotating the antenna system for generating signals for application to said pairs of deflecting elements to cause the cathode ray beam to scan the target screen of said oscilloscope radially in synchronism with the periodic pulse modulation of said transmitter and to rotate the radial scan so caused at an angular velocity equal at any given instant to the algebraic sum of the instantaneous angular velocity of rotation of the antenna system and the instantaneous rate of change of compass heading of said mobile craft and means for applying said signals to the said pairs of deflecting elements.

6. Navigational radar apparatus, for use on a mobile craft and providing on the screen of a cathode ray oscilloscope a plan position indication display of which the indication corresponding to a fixed compass direction from the mobile craft is automatically maintained, in operation, in a fixed orientation on the screen of said cathode ray oscilloscope notwithstanding any alteration in the compass heading of the mobile craft, the said apparatus comprising, a rotatable directive beam antenna system, means for rotating the antenna system about an axis which is vertical when the mobile craft is on an even keel, a periodic pulse modulated radio frequency transmitter, a receiver, means for connecting said transmitter and the receiver to the antenna system, a cathode ray oscilloscope having electrode elements for modulating the intensity of the cathode ray beam in dependence upon signals applied thereto and two deflecting elements disposed at right angles to one another, circuit means connecting said receiver to said modulating electrode elements to modulate the intensity of said cathode ray beam in dependence upon the signals received by the receiver, a compass on the craft, electromechanical differential means connected to said compass and to said means for rotating the antenna system for generating signals to actuate said deflecting elements to cause the cathode ray beam to scan the target screen of said oscilloscope radially in synchronism with the periodic pulse modulation of said transmitter and to rotate said radial scan at an angular velocity equal at any given instant to the algebraic sum of the instantaneous angular velocity of rotation of the antenna system and the instantaneous rate of change of compass heading of said mobile craft, said electro-mechanical differential means comprising means for generating two periodic saw tooth signal waves synchronised to the periodic pulse modulation of said transmitter and each one amplitude modulated by a different one of two substantially equal sinusoidal voltages in phase quadrature and having an angular velocity at any given instant equal to the algebraic sum of the instantaneous angular velocity of rotation of the antenna system and the instantaneous rate of change of compass heading of said mobile craft, and circuit means connecting said differential electromechanical means to said deflecting elements for applying a different one of the said two periodic saw tooth signal waves to each of the said deflecting elements.

7. Navigational radar apparatus, for use on a mobile craft and providing on the screen of a cathode ray oscilloscope a plan position indication display of which the indication corresponding to a fixed compass direction from the mobile craft is automatically maintained, in operation, in a fixed orientation on the screen of said cathode ray oscilloscope notwithstanding any alteration in the compass heading of the mobile craft, the said apparatus comprising, a rotatable directive beam antenna system, means for rotating the antenna system about an axis which is vertical when the mobile craft is on an even keel, a periodic pulse modulated radio frequency transmitter, a receiver, means for connecting said transmitter and the receiver to the antenna system, a cathode ray oscilloscope of the electro-magnetic deflection type having electrode elements for modulating the intensity of the cathode ray beam in dependence upon signals applied thereto and two pairs of deflecting coils disposed at right angles to one another, circuit means connecting said receiver to said modulating elements to modulate the intensity of said cathode ray beam in dependence upon signals received by said receiver, a compass on the craft, electromechanical differential means connected to said compass and to said means for rotating the antenna system for generating signals to actuate the two pairs of deflecting coils to cause the cathode ray beam to scan the target screen of said oscilloscope radially in synchronism with the periodic pulse modulation of said transmitter and to rotate said radial scan at an angular velocity equal at any given instant to the algebraic sum of the instantaneous angular velocity of rotation of the antenna system and the instantaneous rate of change of compass heading of said mobile craft, said electro-mechanical differential means comprising a periodic saw tooth signal generator synchronised to the periodic pulse modulation of said transmitter, a rotary transformer having a rotatable primary winding and two secondary windings disposed relative to said primary winding so that currents induced in them by a steady current flowing in the primary winding whilst it is rotating at constant velocity are substantially sinusoidal and in phase quadrature, circuit means connecting a pair of output terminals of said saw tooth signal generator to the primary winding, means for rotating the primary winding at the instantaneous angular velocity of rotation of the antenna system and means driven by a remote repeater motor from the compass of said mobile craft for rotating said two secondary windings independently of the primary winding at an angular velocity equal to the instantaneous rate of change of compass heading of said mobile craft, and circuit means connecting the two secondary windings of said radar transformer one to each of the two pairs of deflecting coils of the cathode ray oscilloscope.

8. Navigational radar apparatus, for use on a mobile craft and providing on the screen of a cathode ray oscilloscope a plan position indication display of which the indication corresponding to a fixed compass direction from the mobile craft is automatically maintained, in operation, in a fixed orientation on the screen of said cathode ray oscillo-scope notwithstanding any alteration in the compass heading of the mobile craft, the said apparatus comprising, a rotatable directive beam antenna system, means for rotating the antenna system about an axis which is vertical when the mobile craft is on an even keel, a periodic pulse modulated radio frequency transmitter, a receiver, means for connecting said transmitter and the receiver to the antenna system, a cathode ray oscillo-scope of the electrostatic deflection type having electrode elements for modulating the intensity of the cathode ray beam in dependence upon signals applied thereto, and two pairs of deflecting electrodes disposed at right angles to one another, circuit means connecting said receiver to said modulating electrode elements to modulate the intensity of said cathode ray beam in dependence upon signals received by said receiver, electromechanical differential means for generating signals for application to said two pairs of deflecting electrodes to cause the cathode ray beam to scan the target screen of said oscilloscope radially in synchronism with the periodic pulse modulation of said transmitter and to rotate said radial scan at an angular velocity equal at any given instant to the algebraic sum of the instantaneous angular velocity of rotation of said antenna system and the instantaneous rate of change of compass heading of said mobile craft, said electro-mechanical differential means comprising a differential gear train, means for driving said gear train independently in accordance with both the rotation of said antenna system and the change in compass heading of said mobile craft, a sine-cosine potentiometer, having a shaft driven by the differential drive of said gear train for generating two substantially sinusoidal signals in phase quadrature having an angular velocity equal to the angular velocity of rotation of the said shaft, a source of square wave signals synchronised to the periodic pulse modulation of said transmitter, two modulator circuits and means connecting each of said modulator circuits to said source of square wave signals and to a different one of the two sinusoidal signal outputs of said sine-cosine potentiometer to generate two square wave signals each amplitude modulated by a different one of the said two sinusoidal signals, two saw tooth wave generators, for generating a saw tooth wave of amplitude proportional to the ampliude of an applied square wave, means connecting the output terminals of said two modulator circuits one to each of said two saw tooth wave generators, and means connecting the output terminals of said two saw tooth wave generators one to each pair of deflecting electrodes of the cathode ray oscilloscope.

References Cited in the file of this patent

UNITED STATES PATENTS

| | | |
|---|---|---|
| 2,208,378 | Luck | July 16, 1940 |
| 2,209,191 | Dearing | July 23, 1940 |
| 2,252,083 | Luck | Aug. 12, 1941 |
| 2,272,607 | Higonnet | Feb. 10, 1942 |
| 2,400,791 | Tolson | May 21, 1946 |
| 2,409,456 | Tolson | Oct. 15, 1946 |
| 2,412,670 | Epstein | Dec. 17, 1946 |
| 2,421,747 | Engelhardt | June 10, 1947 |
| 2,422,975 | Nicholson | June 24, 1947 |
| 2,426,217 | Hoisington | Aug. 26, 1947 |
| 2,471,516 | Bryant | May 31, 1949 |
| 2,480,208 | Alvarez | Aug. 30, 1949 |
| 2,573,021 | Higinbotham | Oct. 30, 1951 |